Feb. 18, 1969   YOH MITA   3,428,569
ZINC SULPHIDE PHOSPHORS ACTIVATED BY PHOSPHORUS AND LEAD
Filed March 23, 1966

INVENTOR.
YOH MITA
BY
OSTROLENK, FABER, GERB & SOFFEN
ATTORNEYS

United States Patent Office 3,428,569
Patented Feb. 18, 1969

3,428,569
ZINC SULPHIDE PHOSPHORS ACTIVATED BY PHOSPHORUS AND LEAD
Yoh Mita, Tokyo, Japan, assignor to Nippon Electric Company Limited, Tokyo, Japan
Filed Mar. 23, 1966, Ser. No. 536,922
Claims priority, application Japan, Mar. 25, 1965, 40/17,388
U.S. Cl. 252—301.6          13 Claims
Int. Cl. C09k 1/20, 1/12

The instant invention relates to solid fluorescent materials commonly referred to as "phosphors" and more particularly to a novel and improved form of zinc sulphide phosphors that emit yellow or greenish yellow luminescence of a high intensity by injection of energy in various forms to the phosphors.

In recent years, fluorescent materials, or phosphors, have been used in various illumination devices such as, for example, fluorescent lamps and electro-luminescent plates or for improvements in brightness characteristics of display devices such as cathode-ray tubes and/or color TV tubes. Such phosphors require as a prime requisite considerably high emission efficiencies. This requirement can be met to a certain extent through the use of conventional zinc sulphide phosphors that presently find widespread use because these phosphors become luminescent at considerably high brightness under the stimulus of energy in the form of ultraviolet radiation, X-rays, electrons, or α particles. Although many zinc sulphide phosphors that luminesce in various coolrs are presently known depending on the kind of activator to be incorporated or on the manufacturing conditions, those phosphors having high emission efficiencies are restricted to copper-activated zinc sulphide phosphors which become luminescent in blue, green, or violet color. Such colors of luminescence emission are not appropriate for devices intended for observational use by the human eye, because the relative visibility for luminescence in said colors, namely in the shorter visible spectral wavelength region, is low. Accordingly, notwithstanding the fact that the advent of phosphor is capable of emitting yellow or greenish yellow luminescence, which luminescence has high relative visibility, at high emission efficiencies and further notwithstanding the fact that practical usage of such phosphors is strongly desired, such expectations have yet to be realized insofar as the present state of the art is concerned.

Among known zinc sulphide phosphors capable of emitting yellow or greenish yellow luminescence there exists a manganese-activated phosphor which affords appreciably bright yellow luminescence. The brightness of luminescence for this phosphor, however, is markedly inferior to that of the previously mentioned phosphors whose emissions are in the short or visible spectral wavelength region. Another phosphorus-activated zinc sulphide phosphorus which was proposed by A. McKeag and P. W. Ranby in a U.S. technical magazine entitled "Journal of Electro-Chemical Society" 1949, vol. 96, page 85, is known to emit strong yellow luminescence. The manufacturing process of this phosphor, however, is invariably beseiged with the nuisance of requiring a reducing atmosphere and still further, the brightness of its luminescence can by no means be said to be high.

Still another lead-activated zinc sulphide phosphor has been developed by the inventor of the instant invention and is fully described in the patent application entitled "Method For Preparation of Zinc Sulphide Phosphors" filed in Japan, Jan. 31, 1964, bearing patent application No. 4800/1964. Although this phosphor can emit bright yellow luminescence, the problem encountered is that a dense sulphurizing atmosphere is required in the preparation process.

Accordingly, an object of the instant invention is to provide yellow or greenish-yellow emitting zinc sulphide phosphor which will afford the highest visibility to the human eye and at the same time, greater brightness than conventional zinc sulphide phosphors.

Another object of the instant invention is to provide yellow or greenish-yellow emitting zinc sulphide phosphors of extremely high brightness which incorporate activators but which do not require any atmosphere such as a reducing atmosphere, during the manufacturing process.

An outstanding feature of the zinc sulphide phosphors, in accordance with the instant invention, is that lead and phosphorus are simultaneously incorporated in zinc sulphide by the diffusion process as two coexistent activators. While fluorescent materials incorporating a single activator, such as lead or phosphorus is known to emit yellow luminescence as was previously mentioned, the simultaneous incorporation of two activators such as lead and phosphorus has never previously been attempted. The reason is due to a premature conclusion that, because of diffusion of a single activator into zinc sulphide is a rather difficult technique and calls for an atmosphere such as a sulphurizing atmosphere to promote the diffusion, the diffusion of two activators would probably be much more difficult. This invention has come into being based on the finding of the inventor that coexistent activators such as lead and phosphorus have effective charges of opposite signs in zinc sulphide and accordingly, the diffusion of either activator into zinc sulphide is greatly promoted by the other under the coexistence of the activators.

Accordingly, the phosphors as modified in the manner taught by the instant inventon not only luminesce in forms comparable to the sum of two luminescences due to individual activators, but have been found to luminesce at significantly higher emission efficiencies than those which can be expected from the simple addition of two separate and independent luminescences, because the concentrations of coexistent activators in zinc sulphide in the manner taught by this invention become significantly higher than those of conventional practice.

Another feature of this invention is that the need for any atmosphere for promoting the diffusion of activators in the course of preparation of the phosphors is completely avoided which, in turn, results in more effective control of partial vapor pressures of the constituents in atmosphere when compared with the control capabilities under conventional practice. This leads to a manufacturing process of the phosphors which, in addition to providing outstanding characteristics, results in a phosphor which can be produced by an extremely simple process.

It is therefore a primary object of the instant invention to provide zinc sulphide phosphors having extremely high luminescence intensity.

Another object of this invention is to provide zinc sulphide phosphors having extremely high luminescence intensity characteristics due to the addition of more than one coexistent activator.

Another object of this invention is to provide zinc sulphide phosphors having extremely high luminscence intensity characteristics due to the addition of more than one coexistent activator wherein two preferred coexistent activators are lead and phosphorus.

Another object of the instant invention is to provide a novel process for producing zinc sulphide phosphors which include the addition of coexistent activators into the zinc sulphide phosphor.

Still another object of the instant invention is to provide a novel process for producing zinc sulphide phosphors which include the addition of coexistent activators into the zinc sulphide phosphor, which process does not require the presence of a reducing atmosphere.

These and other objects of the instant invention will become apparent when reading the accompanying description and drawings in which.

To facilitate an understanding of the instant invention, the principles of the invention and particularly the diffusion of the two activators will hereinafter be described with the aid of chemical equations. The chemical reaction for the diffusion of phorphorus alone into zinc sulphide where the number of effective charges on each ion and the number of ions are taken into consideration can be expressed as $$2P + 3Zn \rightarrow 2P^-(S) + V_S^{++} + 3ZnS \qquad (1)$$

In Equation (1) $P^-(S)$ denotes trivalent phosphorus ions substituted at sulphur lattice points which carry 1-unit negative effective charge $V_S^{++}$ denotes sulphur vacancies each carrying a 2-unit positive effective charge. Similarly, the diffusion of lead ions into zinc sulphide may be expressed as $$Pb + 2S \rightarrow Pb^{2+}(Zn) + V_{Zn}^= + 2ZnS \qquad (2)$$

In Equation 2, $Pb^{2+}(Zn)$ denotes tetravalent lead ions substituted at zinc lattice points wherein each ion carries a two-unit positive effective charge while $V_{Zn}^=$ denotes zinc vacancies each carrying a two-unit negative effective charge. The chemical reaction that takes place when phosphorus and lead are diffused into zinc sulphide simultaneously may be construed as the aforementioned two chemical reactions taking place at the same time, and accordingly may be expressed by the following Equation3 which results from Equation 1 multiplied by 2 added to Equation 2 multiplied by 3:

$$4P + 3Pb \rightarrow 4P^-(S) + 3Pb^{++}(Zn) + V_{Zn}^= + 4ZnS \qquad (3)$$

It is evident from Equation 3 that when phosphorus and lead diffuse simultaneously into zinc sulphide as two activator sources, phosphorus and lead ions will carry effective charges of opposite signs to one another and accordingly, the diffusion of one activator is greatly promoted by the presence of the other due to the charge compensation action between the oppositely charged ions.

The foregoing, as well as other features of this invention, will become more apparent from a consideration of an embodiment of this invention presented in conjunction with the figures.

Figure 1:
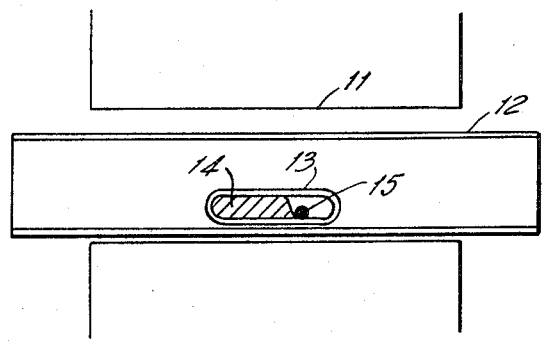
FIGURE 1 is an elevational view of apparatus which is employed in the process used to yield zinc sulphide phosphors in accordance with the method of the instant invention.

As one preferred embodiment of the instant invention, a zinc sulphide phosphor containing 0.1 mol percent lead and 0.1 mol percent phosphorus was prepared in the following manner:

As shown in FIGURE 1, 10 grams of pure zinc sulphide powder 14, 200 milligrams of lead 15, and 40 milligrams of phosphorus (not shown) were introduced into a quartz vessel 13 having an internal volume of 10 cubic millimeters. The vessel 13 was then vacuum-sealed and placed into a quartz tube 12 which is positioned within an electric furnace 11. The phosphor was obtained by heating vessel 13 at a temperature in the range between 1050° C. and 1200° C. for approximately 8 consecutive hours.

Figure 2:
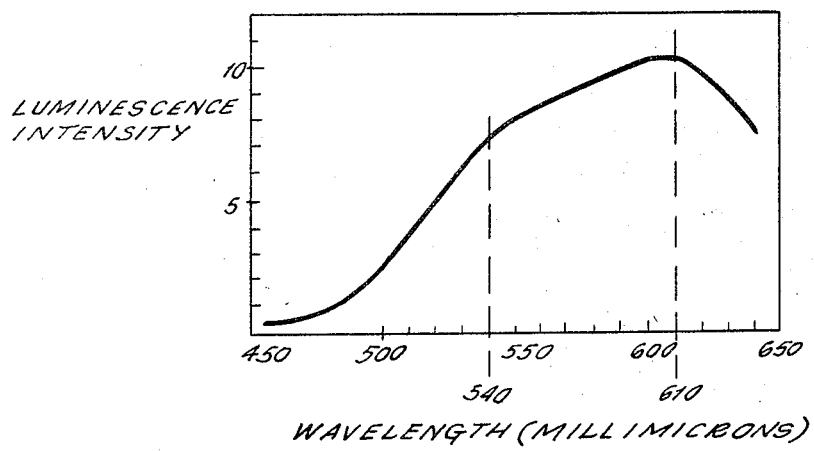
FIGURE 2 is a diagram illustrating the luminescence emission spectrum of a fluorescent material produced by the method of the instant invention.

The zinc sulphide phosphor thus prepared was proven to have a spectral distribution curve 16 as shown in FIGURE 2 when stimulated by either ultraviolet radiation or by cathode rays (i.e., an electron beam). Making reference to the spectral diagram of FIGURE 2, the intensity of luminescence is presented along the ordinate in arbitrary units while the wavelength in millimicrons is plotted along the abscissa. The color of luminescence obtained was yellow or greenish yellow. The emissivity characteristics obtained from this phosphor was found to yield the additive characteristics, roughly speaking, of the emissivity luminescence intensity which is maximum at approximately the wavelength of 540 millimicrons for a mixture containing phosphorus alone and a maximum intensity at a wavelength of 610 millimicrons for a phosphor mixture incorporating lead alone. The major advantage, however, of the use of coexistence activators in the phosphor is that the luminescent intensity of phosphors produced in accordance with the principles of the instant invention were significantly higher than the sum of the two maximum intensities which can be obtained from phosphors containing lead alone and phosphorus alone. The reason for this is probably attributable to the fact that greater amounts of the two activators employed can be incorporated in the mixture when introduced in coexistence than that which would be obtained if the two activators were incorporated so as not to be affected by one another.

The amounts of phosphorus and lead to be incorporated in zinc sulphide can be controlled by varying the conditions of preparation, and particularly the concentration of phosphorus or lead in unit volume to be introduced into the quartz vessel 13. It has further been confirmed by experiment that the luminescence emission characteristics of phosphors developed by the method of the instant invention remain substantially unchanged if the amount of lead is increased or decreased within a certain range, with respect to the amount of lead mentioned in the previous embodiment, however, the advantageous effect resulting from coexistence of the two activators has been found to be insignificant in the case where lead in amounts of less than 0.01 mol percent are incorporated into the mixture and hence this figure represents the lower critical value at which the emissivity characteristic becomes greatly pronounced.

In accordance with still another finding by applicant, the amount of phosphorus under coexistence of the two activators has a predominant effect on the emission characteristics and notably on the color of luminescence. More specifically, the emission characteristics of the phosphors are substantially unaffected if the amount of incorporation of phosphorus is larger than 0.1 mol percent. The color of luminescence has been found to become greenish when the amount of phosphorus introduced into the mixture is less than 0.1 mol percent and at the same time, the emission intensities of such phosphors tend to be decreased for amounts of phosphorus less than 0.1 mol percent. When the amount of phosphorus added is less than 0.01 mol percent, the technical merits of the invention have been found to be markedly diminished. For this reason the critical amount of incorporation of both phosphorus and lead has been found to be 0.01 mol percent or greater. The conditions of preparation which corresponds to this critical amount are as follows: Heating temperature —800° C. or greater; phosphorus concentration per unit volume —2 or more milligrams per cubic centimeter.

Making reference again to the previous embodiment, the zinc sulphide phosphor which was prepared at the specified temperature assumes a hexagonal crystal structure commonly referred to as the wurtzite structure, whereas that prepared at a heating temperature of less than 1024° C. assumes a cubic crystal structure commonly referred to as a sphalerite structure. In the latter example, the wavelength for the maximum luminescence spectral value has been found to shift to the longer wavelength side by approximately 10 millimicrons as compared with that for the previous embodiment, with the result that the phosphor emitted a yellow luminescence.

While it has been mentioned previously in connection with the preferred embodiment, that pure zinc sulphide powder, lead, and phosphorus were introduced into a vacuum-sealed quartz vessel 13, it should be noted that there is no objection to the introduction of these ingredients into an open tube or placing the ingredients into an atmosphere which is other than a vacuum. These alternative methods are acceptable so long as precautionary measures are taken to check for the presence of a fugitive phosphorus vapor or alternatively, to provide for security of the required phosphorus concentration.

It can therefore be seen from the foregoing that the instant invention provides a novel zinc sulphide phosphor and method for producing same in which the coexistent presence of two activators, namely lead and phosphorus, yields a phosphor having emission characteristics, when properly stimulated, which far exceed the emission intensity characteristics of conventional phosphors.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A zinc sulphide phosphor containing at least 0.01 mol percent of lead,
   and at least 0.01 mol percent of phosphorus,
   said amounts of phosphorus and lead being added as two coexistent activators.

2. A zinc sulphide phosphor containing two coexistent activators,
   one of said activators being lead;
   the other of said activators being phosphorus;
   the amount of phosphorus added being in the range from 0.01 to 0.10 mol percent.

3. A zinc sulphide phosphor containing two coexistent activators,
   one of said activators being lead;
   the other of said activators being phosphorus;
   the amount of phosphorus added being in the range from 0.01 to 0.10 mol percent;
   the amount of lead added being in the range from 0.01 to 0.10 mol percent.

4. A method for producing zinc sulphide phosphors comprising the steps of:
   providing a measured amount of zinc sulphide, and at least 0.01 mol percent each of lead and phosphorus;
   placing the above ingredients in a vessel;
   and heating said vessel to a temperature in the range from 800° C. to 1200° C. under conditions to maintain a predetermined phosphorus concentration and for a time sufficient to produce said phosphor.

5. A method for producing zinc sulphide phosphors comprising the steps of:
   providing measured amounts of zinc sulphide in powdered form, and at least 0.01 mol percent each of lead and phosphorus;
   placing the above ingredients in a vessel;
   and heating said vessel to a temperature in the range from 800° C. to 1200° C. under conditions to maintain a predetermined phosphorus concentration and for a time sufficient to produce said phosphor.

6. A method for producing zinc sulphide phosphors comprising the steps of:
   providing measured amounts of zinc sulphide, and at least 0.01 mol percent each of lead and phosphorus;
   placing the above ingredients in a quartz vessel;
   and heating said vessel to a temperature in the range from 800° C. to 1200° C. under conditions to maintain a predetermined phosphorus concentration and for a time sufficient to produce said phosphor.

7. A method for producing zinc sulphide phosphors comprising the steps of:
   providing measured amounts of zinc sulphide, and at least 0.01 mol percent each of lead and phosphorus;
   placing the above ingredients in a vessel;
   and heating said vessel to a temperature in the range from 800° C. to 1200 C. under conditions to maintain a predetermined phosphorus concentration for a period of approximately eight hours.

8. The method of claim 4 wherein said vessel is vacuum sealed prior to the heating operation.

9. The method of claim 4 wherein said vessel is open during the heating operation and further including the step of conrolling the vapor pressure of the phosphorus in order to maintain the required phosphorus concentration.

10. The method of claim 4 wherein zinc sulphide powder of approximately 97.5 percent by weight is added to lead of approximately 2 percent by weight and phosphorus of approximately 0.5 percent by weight.

11. A method for producing zinc sulphide phosphors comprising the steps of:
    providing measured amounts of zinc sulphide, and at least 0.01 mol percent each of lead and phosphorus;
    placing the above ingredients in a vessel;
    and heating said vessel to a temperature in the range of 1050° C. to 1200° C. under conditions to maintain a predetermined phosphorus concentration and for a time sufficient to produce said phosphor.

12. The method of claim 11 wherein zinc sulphide of approximately 97.5 percent by weight and lead of approximately 2 percent by weight is provided in the vessel;
    and a phosphorus concentration of at least two milligrams per cubic millimeter of the vessel is provided in said vessel.

13. The method of claim 4 wherein lead in the range from 0.01 to 0.10 mol percent and phosphorus in the range from 0.01 to 0.10 mol percent is provided in the vessel.

References Cited

McKeag et al.—New Zinc Sulfide Phosphors Activated by Phosphorus—Journal of the Electrochemical Society, vol. 98, No. 2, August 1949, pp. 85–89.

Smit et al.—The Luminescence of Zinc Sulfide Activated by Lead—Journal of the Optical Society of America, vol. 39, No. 8, August 1949, pp. 661–663.

HELEN M. McCARTHY, *Primary Examiner.*

ROBERT D. EDMONDS, *Assistant Examiner.*